April 17, 1934.　　　　N. E. FOLEN　　　　1,955,418
ILLUMINATED CONNECTER
Filed April 21, 1932　　　2 Sheets-Sheet 1
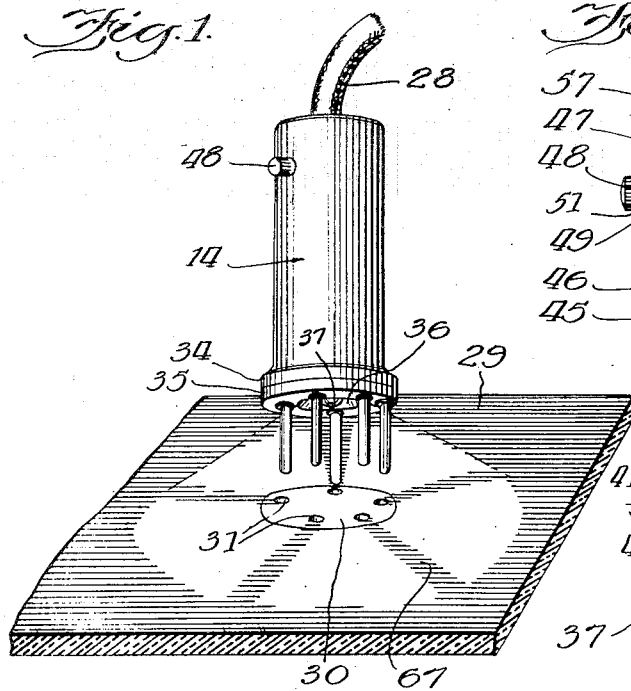
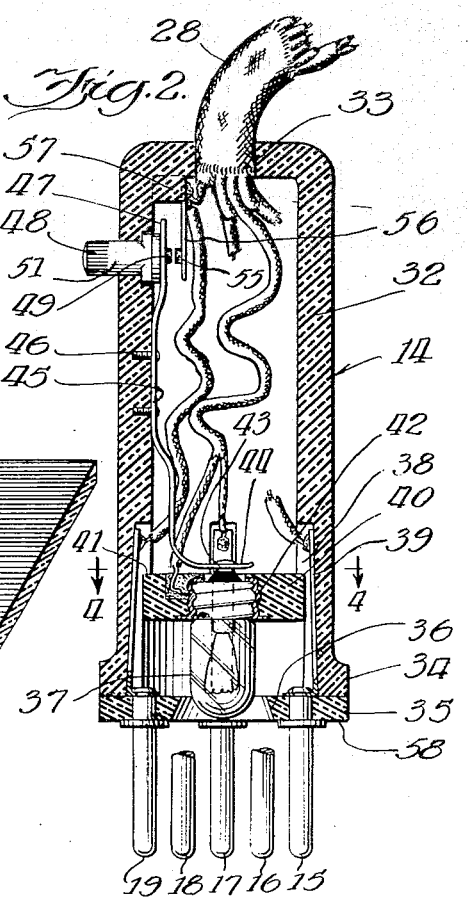
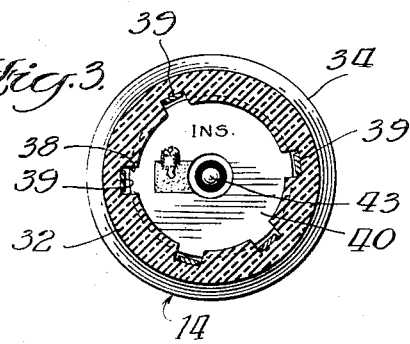
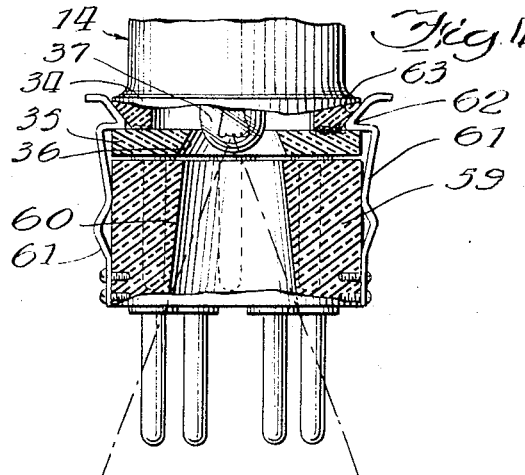
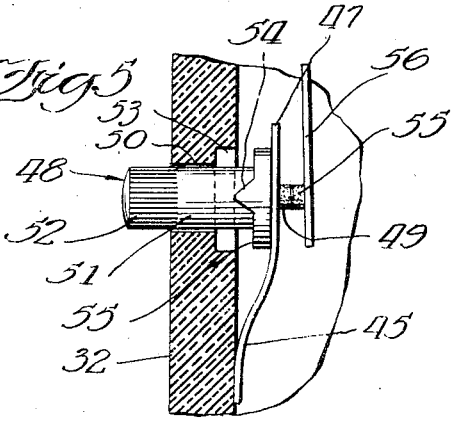
Inventor
Nels Elvin Folen
By Williams, Bradbury,
McCaleb & Hinkle Attys April 17, 1934.  N. E. FOLEN  1,955,418
ILLUMINATED CONNECTER
Filed April 21, 1932   2 Sheets-Sheet 2
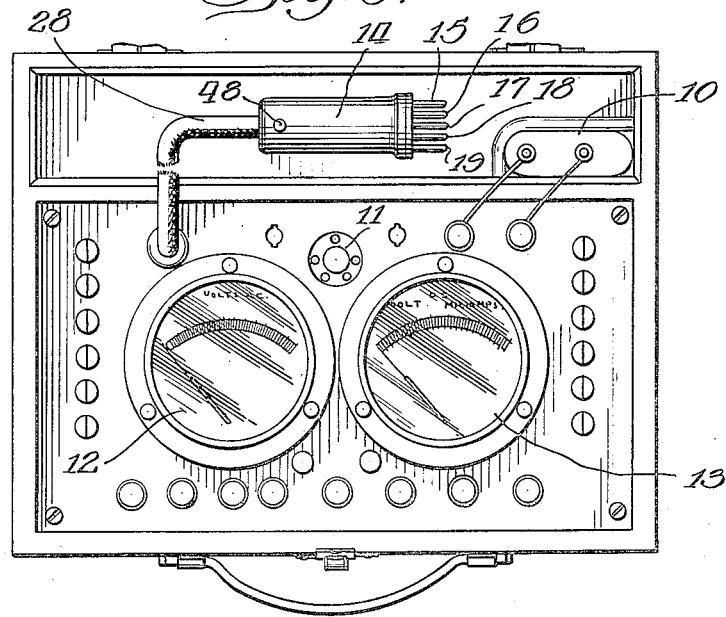
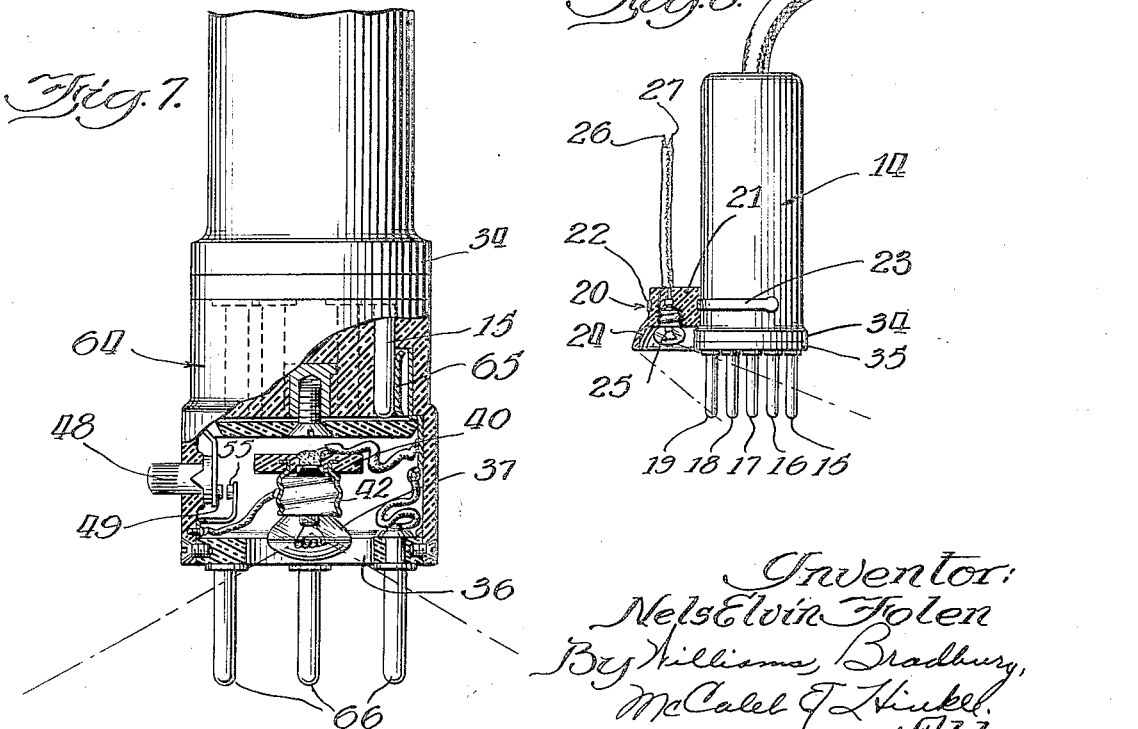
Inventor:
Nels Elvin Folen
By Williams, Bradbury,
McCaleb & Hinkle
Attys.

Patented Apr. 17, 1934

1,955,418

UNITED STATES PATENT OFFICE 1,955,418

ILLUMINATED CONNECTER

Nels Elvin Folen, Portland, Oreg., assignor to Jewell Electrical Instrument Co., Newark, N. J., a corporation of New Jersey Application April 21, 1932, Serial No. 606,559

1 Claim. (Cl. 173—324)

The present invention relates to illuminated connecters, and is particularly concerned with the provision of an improved connecter having means for illuminating the contacts into which the prongs of the connecter are to be inserted and for providing an auxiliary source of illumination for use as a trouble light.

The invention is of particular importance in connection with testing instruments of the type having a test plug provided with prongs which are connected by cable conductors to the testing device, the plug being utilized for connection to the socket of a radio receiving set or other apparatus having radio tubes for the purpose of effecting a test of the condition of the circuits, apparatus or tubes. However, the invention is also of general application and may be applied to various types of connecter plugs, as the same difficulty is found in all of the connecters of the prior art in locating the complementary connecter contacts which are to be engaged by the connecter.

In effecting a test of a radio receiving set or other apparatus having radio tubes and sockets, it is customary to remove the tube and place it in a socket provided in the testing device, and then the test plug of the testing device is inserted in an appropriate socket of the receiving set. The sockets of amplifying apparatus are often relatively inaccessible and generally located at a point where there is a lack of illumination so that the users of such testing devices experience considerable difficulty in inserting the plug for test purposes.

Since the test plug is utilized in determining the circuit conditions at the contacts of each socket, the operator frequently has the test plug in his hand, and it would be very advantageous to increase the utility of the test plug, which is a part of every modern radio receiving set tester. One of the first tests which should be made upon a radio receiving set is a visual test of the circuits to make sure that there are no broken connections which would be visible to the tester without extensive tests. This is customarily done by the use of a separate flash light, but the flash lights represent an additional piece of equipment which it is necessary to carry, and they are often too big to be inserted to illuminate the points where inspection is desired.

One of the objects of the invention is the provision of an improved trouble light which is adapted to be embodied in the test connecter plug of a radio receiving set tester and which may also be energized from the dry cell and which is usually provided with such radio receiving set testers for use in effecting a test of the tubes.

Another object of the invention is the provision of an improved illuminated test plug which is adapted to effect an illumination of the socket into which the prongs of the test plug are to be inserted so that the place for the plug can be found without any difficulty and a test of the set effected in a much shorter time than can be accomplished with the devices of the prior art.

Another object of the invention is the provision of an improved illuminated test plug having its source of illumination so arranged that the prongs on the plug are also illuminated and the shadows cast by the prongs serve to permit the user to locate the prongs in registry with the female contacts of the socket without any difficulty. The prongs of such test plugs in the tubes are spaced unequally, and in some cases are of different sizes, so that the plug or tube must be rotated until the prongs are brought in registry with the predetermined contacts of the socket. The width of the shadows cast by larger prongs is an indication of the type of prong, which enables the operator to locate that prong in registry with the large holes in the socket, and the spacing of the prongs is also indicated very clearly by the shadows, so that the connecter may be rotated until the shadows register with the holes and the connecter prongs inserted without difficulty.

Another object of the invention is the provision of an improved illuminated test plug having a selective switching device by means of which the source of illumination may be controlled at the will of the operator and the same battery may be utilized for the test of tubes or for the illumination of the socket or for a trouble light, without any of these functions interfering with the others.

Where the source of energization for the plug is secured from the same battery which is used for a tube test, the light should be shut off while the tube test is being made, for the reason that the drain of current on the small dry cell would cause a drop in voltage that would give an entirely different reading in the test of the tube. The test of the tube depends upon the application of the proper voltage.

Another object of the invention is the provision of an improved adapter which may be utilized with a five prong connecter to change the connecter to a four prong connecter, and which is also adapted to permit the use of the source of illumination on the plug for illuminating the prongs of the adapter.

Another object of the invention is the provision of an improved detachable trouble light, which may be utilized with test plugs of existing radio receiving set testers.

Another object of the invention is the provision of an improved adapter embodying a source of illumination and a selective switching device, which is adapted to be utilized upon the plugs of existing radio receiving set testers for transforming them from ordinary plugs to illuminated connecter plugs.

Another object of the invention is the provision of an improved illuminated test plug which is sturdy, efficient, economical and capable of manufacture at such a low cost that it may be placed within the means of a large number of purchasers.

Other objects and advantages of the invention will be apparent from the description and from the accompanying drawings, in which similar characters of reference indicate similar parts throughout the several views.

Referring to the drawings, of which there are two sheets,

Fig. 1 is a view in perspective of one of the test plugs constructed according to the present invention and a socket carried by a panel, showing the mode of illumination of the socket and the prongs of the plug, which facilitates the insertion of the prongs;

Fig. 2 is a vertical sectional view taken upon a plane passing through the axis of the plug, with the light bulb and prongs in elevation, showing the details of construction of the test plug of Fig. 1;

Fig. 3 is a transverse sectional view taken on the plane of the line 4—4 of Fig. 2, looking in the direction of the arrows;

Fig. 4 is a fragmentary sectional view taken upon the same plane as that of Fig. 2, showing the application of an improved adapter to the lower end of the test plug of Fig. 2;

Fig. 5 is a fragmentary sectional view of the push button switch of Fig. 2, showing the switch in the closed position;

Fig. 6 is a top plan view of the complete testing equipment for radio receiving sets;

Fig. 7 is a fragmentary sectional view of another modification, showing an ordinary plug in connection with an adapter which is provided with a source of illumination for use with an ordinary plug; and Fig. 8 is another modification, showing a test plug which is equipped with a detachable trouble light, which may be energized from the dry cell of the radio receiving set tester.

Referring to Fig. 6, the radio receiving set tester preferably includes a three cell dry battery 10, which is connected through appropriate leads and circuits of the tester so that it may be utilized for impressing an additional increment of electromotive force upon the tube placed upon the socket 11. The conditions in the radio receiving set are determined by means of the volt meter 12 and combined volt meter and milliammeter 13, and the circuits of the set tester may be substantially as described and shown in the diagrams of prior application Serial No. 526,158, filed March 30, 1931 by John H. Miller.

The set tester is provided with a test plug 14, preferably having five contacts 15—19, which correspond to the contacts of the five prong radio tube, and are spaced in a similar manner to the prongs of a radio tube, so that the plug 14 may be substituted for the socket in the receiving set and the tube placed in the socket 11.

Referring to Fig. 8, this is an elevational view of one modification of the most simple type, in which the plug 14 is provided with a trouble light indicated in its entirety by the numeral 20, adapted to be removably clamped upon the plug 14.

The trouble light 20 may consist of an insulating supporting member 21, to which is secured a metal band 22 having a pair of curved resilient clamping arms 23 adapted to engage the sides of the plug 14. The supporting body 21 is formed with a recess 24, forming a reflector for a light bulb 25 of appropriate full voltage, so that the bulb may be energized from the dry battery 10.

Recess 24 may be provided with a reflector, and the leads 26, 27 may be brought back to connect directly to the battery 10, or they may be incorporated as a part of the cable 28, which includes all of the leads from the tester to the plug.

In some cases, one of the filament leads may be utilized for one side of the lamp connection, and by shifting the connections at the end of the cable, which connects to the tester, any of the prongs can be utilized so long as their leads are properly connected to the battery instead of the usual tester circuits.

The preferred form of the invention is shown in Fig. 1 in connection with a fragment of panel 29, having a socket formation 30 with a plurality of holes 31 and with complementary female contacts carried by the lower side of the panel in registry with the holes 31.

The details of the plug are shown in Fig. 2 in which 32 indicates the shell or casing for the plug, which is preferably constructed of insulating material, such as a phenolic condensation compound, usually called "Bakelite". The shell 32 comprises a hollow cylindrical member, one end of which is provided with a bore 33 for passage of cable 28, and the other end of which is open and preferably provided with a laterally extending attaching flange 34.

The prongs 15—19 are carried by an insulating base plate 35, which may be secured to the attaching flange 34 to close the shell, and the base plate 35 is provided with a centrally located aperture 36 for permitting the egress of light from the bulb 37.

The shell 32 may be provided with a plurality of axially extending grooves 38 for receiving the connecter strips 39 extending from each of the prongs, and an insulating partition 40 may be seated in the cylindrical shell and upon shoulder 41. The partition 40 carries a threaded connecter socket contact 42 for receiving the threaded base of the bulb 37. The bulb 37 may be of the center contact type, the center contact 43 being engaged by the laterally extending end 44 of a strip of metal 45 which is also utilized as a switch member. Metal strip 45 is fixedly secured at a point between its ends to the shell by means of screws 46, and the opposite end 47 of the strip is adapted to be engaged by the lower side of a push button 48 and provided with a contact 49.

The push button is preferably adapted to be turned to secure the switch in closed position, and for this purpose the shell is provided with a bore 50 for slidably receiving the cylindrical body 51 of the push button 48, which has a milled surface 52 adjacent its outer end. The shell is provided with a transverse groove 53 at the inner end of bore 50 for receiving the transverse ridge 54 carried on the lower side of the head 55 of push button 48. When the push button is pushed and turned to the position of Fig. 5, the ridge 54 engages the walls of the shell 32 and holds the contact members 49, 55 in closed position, but the natural resiliency of the member 47 tends to urge the push button to the position of Fig. 2, which it assumes when the ridge 54 is in registry with groove 53 and pressure is removed from the push button.

The other contact 55 may be carried by another resilient metal strip 56, the end of which is fixedly secured to a lug 57 formed inside the shell 32.

As previously stated, a separate pair of leads may be included in the cable 28 for the bulb 37, the contacts 49, 55 being included in series with the leads for the bulb, or the bulb may be energized through any of the other leads of the cable, provided they are properly connected in circuit with the dry battery. The bulb 37 preferably has its outermost tip disposed inside the plane of the end surface 58 of the base 35 so that the bulb will not be hit by any part of the socket, and the aperture 36 preferably tapers outward and is made as large as possible to give a maximum amount of illumination for the contacts.

Referring to Fig. 4, this is a modification showing an adapter which may be utilized with a plug of the type of Fig. 2, the adapter being constructed to permit illumination of its male contacts. Such an adapter may be a four prong or a five prong adapter, or it may include any number of upward prongs. The change is made from a five prong to a four prong adapter by merely connecting the female cathode contact of the adapter to one side of the filament. The adapter 59 is preferably provided with a centrally located aperture or bore 60 extending all the way through the adapter to permit the light from the bulb 37 to come out from the lower side of the adapter. The adapter may be provided with one or more latching members 61 having latching shoulders 62 adapted to engage in complementary recesses 63 formed in the side of the plug so that the adapter is firmly retained upon the plug, but may be released by springing the latches 61 apart.

Referring to Fig. 7, this is another modification, in which the adapter 64 is provided with an enlarged body having a plurality of female contacts 65 for receiving the prongs 15—19 of an ordinary plug and effecting a connection between those prongs and the prongs 66 of the adapter 64. Adapter 64 may be a four contact five prong adapter, a five contact five prong adapter, or a five contact four prong adapter, or any appropriate number of contacts may be used. The adapter itself includes a bulb 37 in this case with a selective push button switch 48, and contacts 49, 55 for controlling the energization of the bulb 37.

The ordinary test plug of Fig. 7 may be transformed into an illuminated test plug by the use of the adapter 64. Energization may be made through the contacts of the plug and the leads of the cable 28 by changing the connection of appropriate leads from the usual circuits to points where these leads would be energized by the battery 10.

The operation of the present invention is as follows: The bulb 37 in the embodiments of Figs. 1 to 7 not only illuminates the socket 30 so that the apertures 31 of the socket may be seen, but it casts a beam of substantially conical form, which illuminates the inner surfaces of the connecter prongs 15—19. These prongs cast shadows 67 on the socket 30, which extend radially from the socket, and it is unnecessary for the user to make certain that he has grasped the plug in such manner as to register with the socket. After the plug is adjacent the socket in Fig. 1, the plug is rotated until the shadows are in registry with the apertures 31 of the socket 30, after which the plug can be shoved into place.

The present plug may also be used as a trouble light, and in some embodiments of the invention the plug may be provided with a small dry battery contained in the shell 32 so that the trouble light may be used without reference to the connection of the source of illumination to the circuits of the tester itself. The user may thus dispense with the usual flash light and his radio set tester is made capable of additional functions without increasing the weight of the testing equipment by any substantial amount. Service men are obliged to carry a certain amount of equipment, and if the same functions can be accomplished by the use of the indispensable test plug, thereby eliminating the necessity for carrying a flash light, the service man is enabled to utilize this space in his kit for other testing equipment which he might otherwise not be able to carry with him.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim is new and desire to secure by Letters Patent of the United States, is:

In a test plug for electric testing devices, the combination of a plug having a plurality of longitudinally extending contact prongs corresponding to the contacts of a radio tube, with a source of illumination carried by said plug and located centrally with respect to said contacts, said source of illumination being energized from connection to predetermined contact prongs of said plug, switch means carried by said plug for controlling said source of illumination, said source being located in said plug substantially within the lower surface of said plug and adapted to project light radially outward with respect to said prongs, whereby the shadows of said prongs may be utilized to determine the proper rotative position of said prongs with respect to a complementary connecter.

NELS ELVIN FOLEN.